(12) United States Patent
Dopfer et al.

(10) Patent No.: US 12,398,647 B2
(45) Date of Patent: Aug. 26, 2025

(54) ROTATING BLADE FOR A TURBOMACHINE

(71) Applicant: MTU Aero Engines AG, Munich (DE)

(72) Inventors: Manfred Dopfer, Unterschleissheim (DE); Salome Gassmann, Munich (DE); Johannes Linhard, Andechs (DE)

(73) Assignee: MTU Aero Engines AG, Munich (DE)

( * ) Notice: Subject to any disclaimer, the term of this patent is extended or adjusted under 35 U.S.C. 154(b) by 177 days.

(21) Appl. No.: 17/860,997

(22) Filed: Jul. 8, 2022

(65) Prior Publication Data
US 2023/0020552 A1    Jan. 19, 2023

(30) Foreign Application Priority Data
Jul. 14, 2021   (DE) .................... 10 2021 118 184.4

(51) Int. Cl.
  *F01D 5/22*    (2006.01)
  *F04D 19/02*   (2006.01)
  *F04D 29/32*   (2006.01)

(52) U.S. Cl.
  CPC .............. *F01D 5/225* (2013.01); *F04D 19/02* (2013.01); *F04D 29/324* (2013.01)

(58) Field of Classification Search
  CPC ...... F01D 5/225; F05D 2240/11; F04D 19/02; F04D 29/324
  See application file for complete search history.

(56) References Cited

U.S. PATENT DOCUMENTS

| | | | |
|---|---|---|---|
| 4,639,997 A | 2/1987 | Brull | |
| 7,270,518 B2 * | 9/2007 | Barb | F01D 5/225 416/191 |
| 7,628,587 B2 * | 12/2009 | McFeat | F01D 5/225 415/173.1 |
| 7,887,295 B2 | 2/2011 | Brittingham et al. | |

(Continued)

FOREIGN PATENT DOCUMENTS

| | | |
|---|---|---|
| DE | 11 2015 001 212 B4 | 8/2021 |
| EP | 1724441 A2 | 11/2006 |

(Continued)

OTHER PUBLICATIONS

Geyer, Friedrich, "Kerbformoptimierung mit Ellipse", Mar. 2, 2020.
(Continued)

*Primary Examiner* — Sang K Kim
(74) *Attorney, Agent, or Firm* — Hinckley, Allen & Snyder, LLP; David R. Josephs

(57) ABSTRACT

The present invention relates to a rotating blade for a turbomachine, having a blade element and a shroud, wherein the shroud is profiled at a peripheral side, i.e., when observed in a tangential section, has a contact flank that is oriented axially, at least proportionally, and has a free flank that is also oriented axially, at least proportionally, and is in fact opposite the contact flank, wherein, when observed in the tangential section, an intermediate segment between the contact flank and the free flank has a first curvature in a first transition segment to the contact flank and has a second curvature in a second transition segment to the free flank, wherein the first curvature is greater than the second curvature.

16 Claims, 4 Drawing Sheets

(56) References Cited

U.S. PATENT DOCUMENTS

| | | | |
|---|---|---|---|
| 10,513,934 B2 | 12/2019 | Zemitis et al. | |
| 10,519,783 B2 | 12/2019 | Rollings et al. | |
| 10,677,072 B2 * | 6/2020 | Ju | F01D 5/225 |
| 10,731,480 B2 | 8/2020 | Adavikolanu et al. | |
| 2005/0106025 A1 | 5/2005 | Snook et al. | |
| 2016/0369643 A1 | 12/2016 | Kitagawa | |
| 2018/0230817 A1 * | 8/2018 | Rollings | F01D 5/225 |

FOREIGN PATENT DOCUMENTS

| | | |
|---|---|---|
| EP | 3338938 A1 | 6/2018 |
| EP | 3382144 A1 | 10/2018 |
| WO | 2021156559 A1 | 8/2021 |

OTHER PUBLICATIONS

Scherrer, Marcus, "Kerbspannung und Kerbformoptimierung," Institut fur Materialforschung, Dissertation, Aug. 2004.

Wei, H. et al., "Mechanism and Machine Theory 156", Department of Mechanical Engineering, College of Engineering, Shantou University (Nov. 3, 2020).

Boljanovic, Slobodanka et al., "Fatigue endurance design of plates with two semicircular edge notches and one quarter-elliptical corner crack or through-the-thickness crack", Mathematical Institute of the Serbian Academy of Sciences and Arts (2019).

* cited by examiner

ROTATING BLADE FOR A TURBOMACHINE

BACKGROUND OF THE INVENTION

The present invention relates to a rotating blade for a turbomachine.

The turbomachine may involve, for example, a jet engine, e.g., a turbofan engine. Functionally, turbomachines are divided into compressor, combustion chamber, and turbine. That is, in the case of the jet engine, intake air is compressed by the compressor and burned in the downstream combustion chamber with kerosene mixed in. The hot gas that arises, a mixture of combustion gas and air, flows through the downstream turbine and is thus expanded. Usually, the turbine is constructed of several stages, each with a stator (guide vane ring) and a rotor (rotating blade ring); the rotors are propelled by the hot gas. Here, in each stage, internal energy is withdrawn proportionally from the hot gas, this energy being converted into movement of the respective rotating blade ring and thus of the shaft.

The present subject relates to a rotating blade for arrangement in the gas channel of the turbomachine. The rotating blade can generally also find use in the compressor region and therefore it can be arranged in the compressor gas channel; if a use is preferred in the turbine region, it is thus placed in the hot-gas channel.

SUMMARY OF THE INVENTION

The present invention is based on the technical problem of providing a particularly advantageous rotating blade.

According to the invention, this problem is solved by the rotating blade and concretely by the structuring of the shroud as discussed below. The latter is profiled on a peripheral side, i.e., found there is an at least proportionally axially oriented, particularly straight or linear free flank, and lying opposite to this, a particularly straight or linear contact flank. In this case, an intermediate segment, which marks the transition between free and contact flanks, when viewed in a tangential section, is made up of different curvatures, that is, it is curved more in a first transition segment to the contact flank than in a second transition segment to the free flank.

This course of curvature or the combination of less curvature in the transition to the free flank and greater curvature in the transition to the contact flank can be of advantage with respect to the mechanical stress level in the shroud, and at the same time, assure a sufficient attachment surface or contact surface to the adjacent shroud. For illustration, if one considers the mechanical stresses alone, in the intermediate segment, a curvature that is as small as possible would be of interest, thus, for example, a radius of curvature that is as large as possible. Therefore, however, if a distance that the groove base lying in the intermediate segment has from a point of intersection of the flanks should increase arbitrarily, in other words, the intermediate segment would thus increasingly be displaced into the flanks.

Therefore, in particular, if the length of the contact flank should also decrease, the attachment surface to the adjacent shroud should thus decrease, and correspondingly, a mechanical stress resulting from the input of force as a consequence of the attachment should increase. And vice versa, with the present subject, thus of the proportionally greater curvature in the transition to the contact flank, whose length can be maintained or at least not excessively reduced, even though the transition to the free flank is made with a smaller curvature, thus for example, a larger radius. Figuratively speaking, more material remains in the base of the groove based on this curvature combination.

Preferred embodiments are discussed below and the entire disclosure, wherein, in the presentation of the features, a distinction is not always made individually between device, method, and/or use aspects; in any case, the disclosure is to be read implicitly with respect to all claim categories. For example, if the advantages of the rotating blade are described in a specific application, this is to be read as a disclosure both of the correspondingly designed rotating blade and use of such.

The terms "axially", "radially" and "circumference" or "circumferentially", as well as the directions belonging thereto (axial direction, etc.) refer to the axis of rotation around which the rotating blade rotates during operation, unless it is expressly indicated to the contrary. The latter typically coincides with the longitudinal axis of the turbomachine, in particular of the engine or the engine module. The "tangential section" is taken in a sectional plane that is tangential to the circumference and here is parallel to the axis, this plane running through the shroud and, in particular, the peripheral side thereof. Preferably, the peripheral side is profiled correspondingly over its entire radial height; thus, the criterion according to the present invention is fulfilled in all tangential sections running through the peripheral side.

The "peripheral side" of the shroud points in the circumferential direction; by its peripheral side, the shroud borders the adjacent shroud (the adjacent rotating blade). The contact flank, for example, can be arranged closer to the axially front side of the shroud (and vice versa, the free flank can be arranged closer to the axially back side); referred to the through flow of the gas channel, the contact flank can thus lie upstream of the free flank (and vice versa, the free flank can lie downstream of the contact flank). The free flank is "axially oriented at least proportionally; a normal line to the surface of the free flank thus has at least one directional component in the axial direction, particularly axially to the front.

Preferably, the free flank lies diagonally (not perpendicularly) to the axial direction, and the surface normal line can enclose with the latter, for example, an angle of at least 20° or 25°, whereby possible upper limits can lie, for example, at most at 45°, 40° or 35° (considered here each time as the smaller of two angles enclosed between the normal line and the axial direction. The contact flank is also axially oriented at least proportionally; its surface normal line therefore also has at least one directional component in the axial direction. Since it is arranged lying opposite axially to the free flank, the surface normal line points in the axially opposite direction, particularly to the back axially. The contact flank preferably also lies diagonally (not perpendicularly) to the axial direction; it can enclose with the free flank, for example, a cutting angle of at least 55° or 60°, with possible upper limits, for example, of at most 75° or 70°.

Generally, in the scope of this disclosure, "a" and "an", unless expressly indicated otherwise, are to be read as the indefinite article and thus also are always to be read as "at least one"; thus, for example, at least two blade elements also can be provided at the shroud ("multi-segment"). In general, the profiled shroud according to the invention can also be a radially inner shroud arranged at the blade element, but preferably it involves an outer shroud (radially outer at the blade element). A sealing tip, that is, a sealing ridge extending in the circumferential direction, i.e., a sealing tip axially in front and another axially in back, can be provided radially outside at the shroud.

According to a preferred embodiment, the intermediate segment has a central segment that lies between the more greatly curved first transition segment and the less greatly curved second transition segment and extends linearly when viewed in the tangential section. Preferably, the central segment transitions tangentially into the first and/or second transition segment; thus, in other words, the first and the second curvatures can be joined together via a tangent. For example, the central segment can create a freedom of design or customization option, i.e., in the integration of the differently pronounced curvatures into an existing design.

In an alternatively preferred embodiment, the first and the second transition segments transition directly into one another, therefore without a straight piece in between them. The transition is preferably tangential in this case; the first and second transition segments then have a common tangent at the transition point.

In a preferred embodiment, the first transition segment has a constant first radius of curvature and/or the second transition segment has a constant second radius of curvature. Preferably, both apply, wherein the first radius of curvature is then less than the second, and correspondingly, when the first curvature is greater than the second. Alternatively to a constant radius or radii, in contrast, generally any course is conceivable, for example, an elliptical shape, or even free form, or fitted with splines. In comparison to this, "ruled geometry", thus shaping with circles or radii and optionally a straight line, can be easier to be measured, for example; also drawings can be more easily prepared or examined, in any case with standard procedures.

According to a preferred embodiment, the intermediate segment is made up exclusively by the first and the second radii of curvature; therefore, there are no other curvatures. Optionally, the linear or tangent piece can be provided therebetween; see above.

According to an embodiment, when observed in a tangential section from the particularly linear contact flank to the particularly linear free flank, every curvature of the peripheral side has the same sign; it is concave in particular, and/or, when observed in a tangential section from the particularly linear contact flank to the particularly linear free flank, every transition from a curved to a linear section is tangential.

Preferably, when observed in a tangential section, the change of course of the peripheral side from the particularly linear contact flank to the particularly linear free flank is always differentiable; thus it has a kink, an abrupt change, or a discontinuity.

In a preferred embodiment, the first transition segment transitions tangentially into the particularly linear contact flank, and/or the second transition segment transitions tangentially into the particularly linear free flank. Observed in the tangential section, a linear extension of the free flank can thus be a tangent at a circle placed in the second transition segment (with a second radius) and/or a linear extension of the contact flank can be a tangent at a circle placed in the first transition segment (with a first radius). The tangential transition can be of advantage, for example, with respect to mechanical stresses.

In a preferred embodiment, a groove formed with the intermediate segment is effectively asymmetric, so that an angle bisecting line lies diagonally to a tangent at the base of the groove. The angle bisecting line lies in the middle between the contact flank and the free flank, and it bisects the intermediate segment by definition in the base of the groove. If one applies a tangent at this point of intersection to the intermediate segment, the latter lies diagonally and thus not at a right angle to the angle bisecting line.

In a preferred embodiment, when viewed optionally from the linear or tangent piece, the intermediate segment is at the most concavely curved; therefore, there is no convexly curved segment. In particular, in connection with the one or more tangential transitions of the transition segments into the contact flank and the free flank, in the "contact flank-intermediate segment-free flank" region, the peripheral side can be provided without a convex curvature overall, which can offer advantages, for example, with respect to leakage. Based on the shaping without curvature reversal or alternation or discontinuity, e.g., a complementary shaping of the adjacent shroud can be simplified and correspondingly, a tighter attachment can be achieved.

In general, the opposite peripheral side of the shroud, which lies opposite to the profiled peripheral side in the circumferential direction, is preferably profiled in a complementary manner. In a rotating blade ring, the rotating blade concerned can be assembled circumferentially with additional rotating blades or segments, wherein, preferably, shrouds of the same construction are placed next to each other circumferentially.

In addition to a rotating blade ring, the subject also relates to a turbine module, in particular to a turbine module for an aircraft engine. For example, the latter may involve a geared turbofan engine, based on coupling by way of the gear; in particular, during operation, the turbine module can rotate faster than the fan of the aircraft engine (it can thus be "rapid-running"). This may involve the turbine module, for example, a high-pressure or, in particular, a low-pressure turbine module.

BRIEF DESCRIPTION OF THE DRAWINGS

The invention will be explained in more detail in the following on the basis of an example of embodiment, wherein the individual features in the scope of the present invention can also be essential to the invention in another combination, and wherein also no distinction is made individually between the different claim categories. Taken individually.

DESCRIPTION OF THE INVENTION

Figure 1:
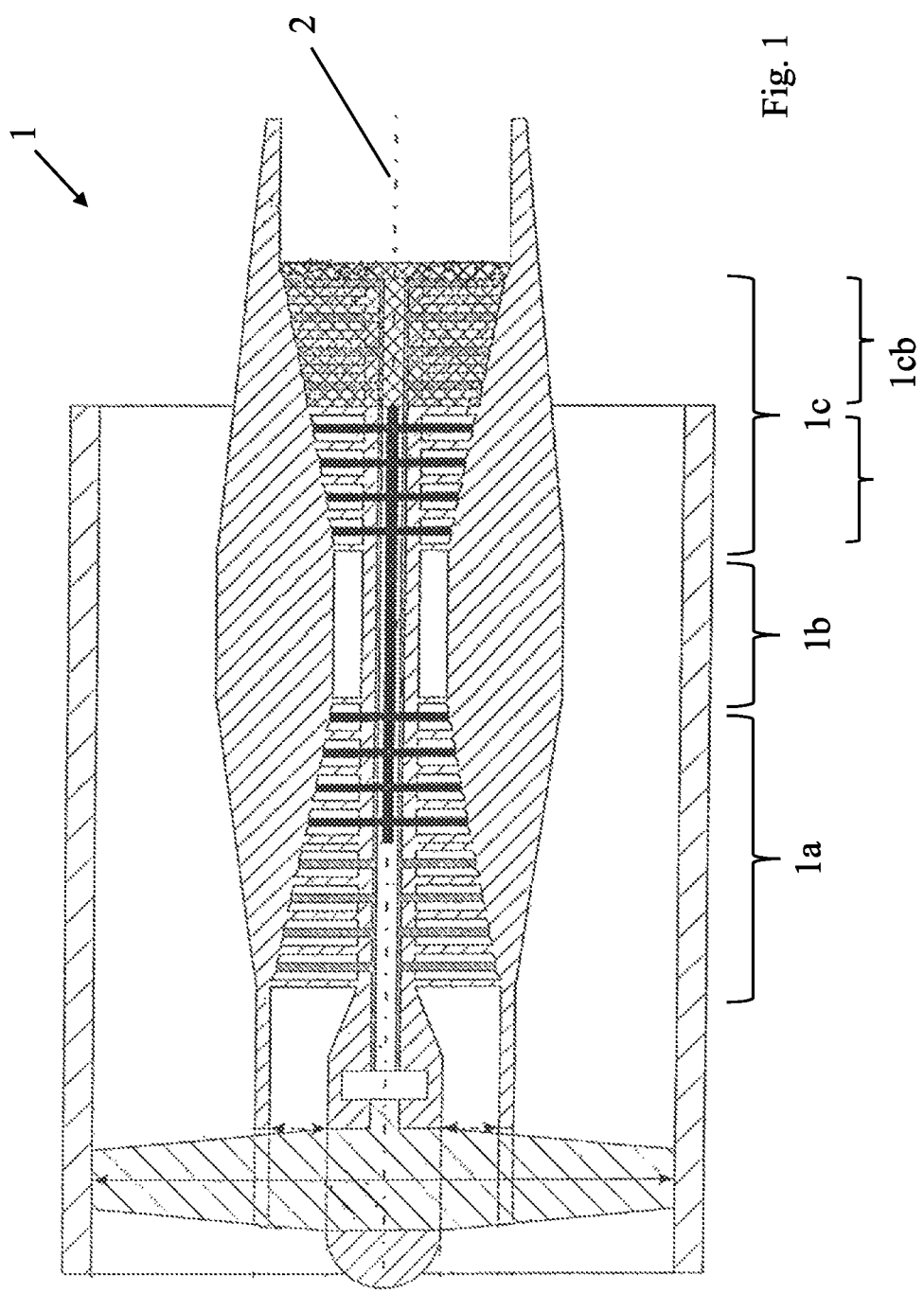
FIG. 1 shows schematically a turbofan engine in an axial section.

FIG. 1 shows a turbomachine 1 in a schematic view, concretely a turbofan engine. The turbomachine 1 is functionally divided into compressor 1$a$. combustion chamber 1$b$ and turbine 1$c$; the latter comprises a high-pressure turbine module 1$ca$ and a low-pressure turbine module 1$cb$. In this case, both the compressor 1$a$ as well as the turbine 1$c$ are each constructed of several stages; each stage is composed of a guide vane ring and a rotating blade ring. During operation, the rotating blades rotate around the longitudinal axis 2.

Figure 2:
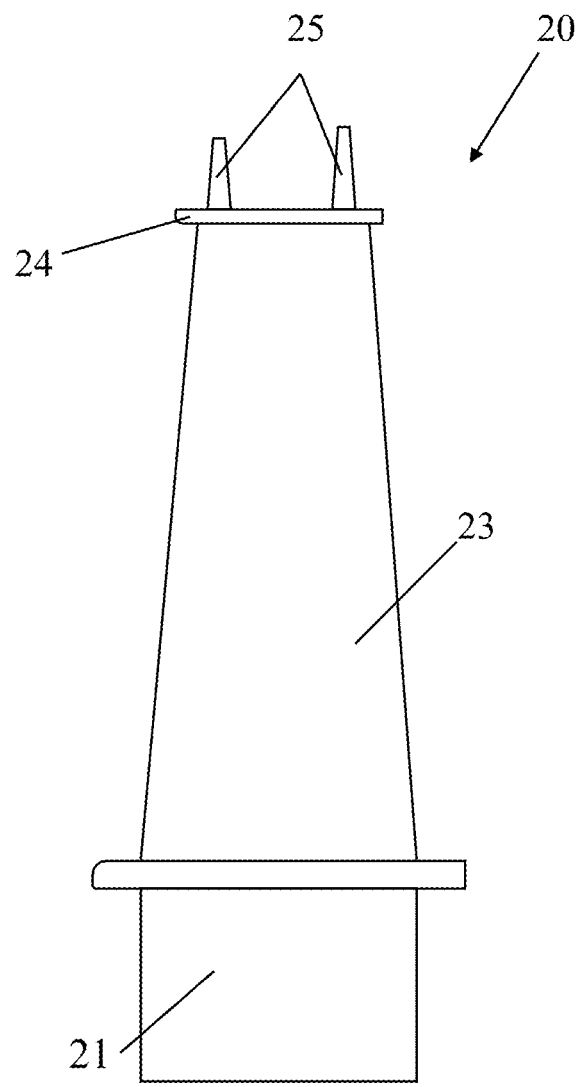
FIG. 2 shows a rotating blade with blade element and shroud in a schematic lateral view.

FIG. 2, in a lateral view, shows a rotating blade 20 of the turbine 1$c$, concretely of the low-pressure turbine module 1$cb$. The latter comprises a rotating blade element 23 and a shroud 24; it is mounted on a disk (not shown here) by way of a blade root 21. Sealing tips 25, which, for example, run into a run-in lining of the housing (not shown) during operation, are arranged radially outside on the shroud 24.

Figure 3:
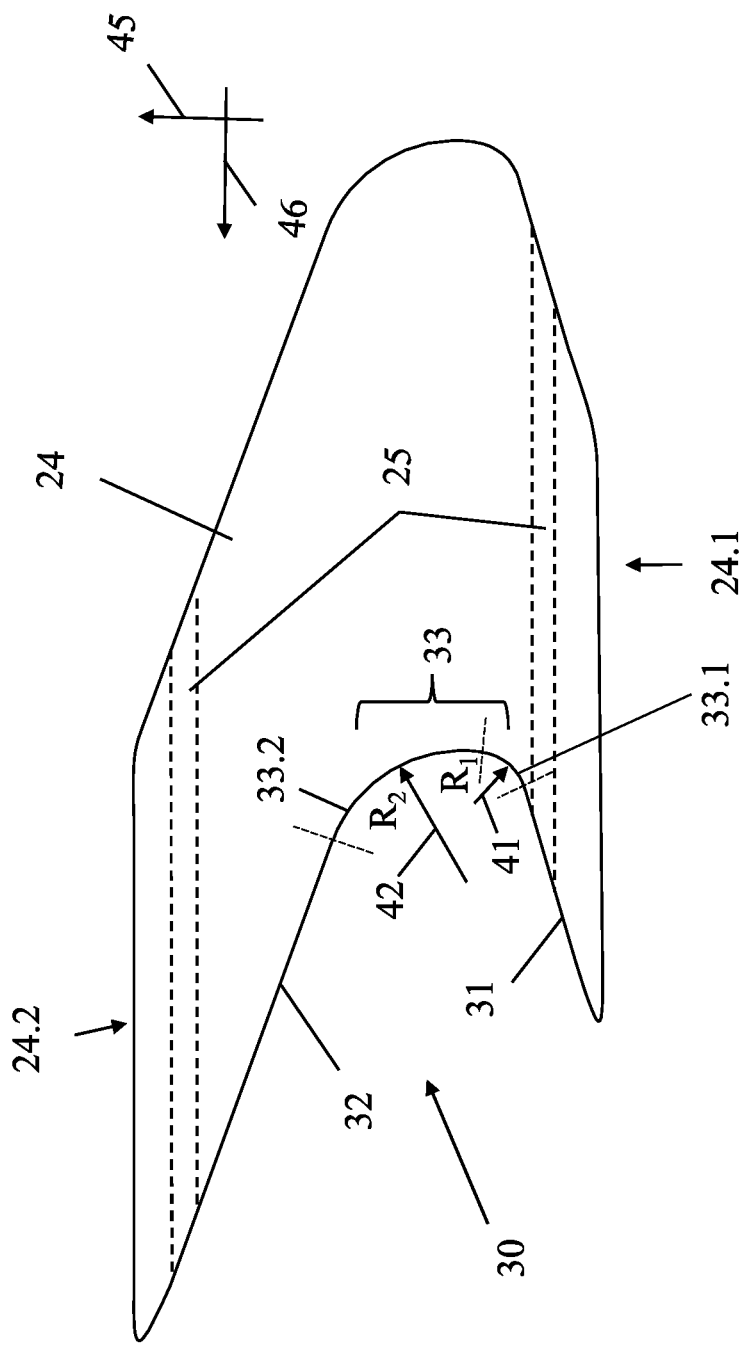
FIG. 3 shows the shroud of the rotating blade according to FIG. 2 in a tangential section.

FIG. 3 shows the shroud 24 in a tangential section, wherein its axial front end 24.1 lies on the left in FIG. 2 and the axial back end 24.2 lies on the right in FIG. 2. Further, for orientation, in FIG. 3, the sealing tips 25 are shown, but they lie outside the plane of section and thus are reproduced by dotted lines. The subject is particularly directed to the profiling of the peripheral side 30 of the shroud 24. The latter is assembled with a free flank 32 and a contact flank 31 that lies opposite axially, as well as an intermediate segment 33 formed therebetween.

The intermediate segment 33 is composed of a first transition segment 33.1 that runs tangentially into the contact flank 31 and has a first curvature 41, which is greater than a second curvature 42, by which a second transition segment 33.2 runs into the free flank 32. The curvatures 41, 42 are realized here by way of a first and a second radius of curvature $R_1$, $R_2$, wherein the greater curvature is associated with a smaller radius, The combination of smaller and greater curvature can be of advantage, on the one hand, with respect to the mechanical stress level in the shroud 24, wherein, on the other hand, the extent of the contact flank 31 and thus attachment to the adjacent shroud is at least not essentially reduced; see the introduction to the description in detail. For orientation in FIG. 3, an axial direction 45 as well as a circumferential direction 46 are also shown.

Figure 4:
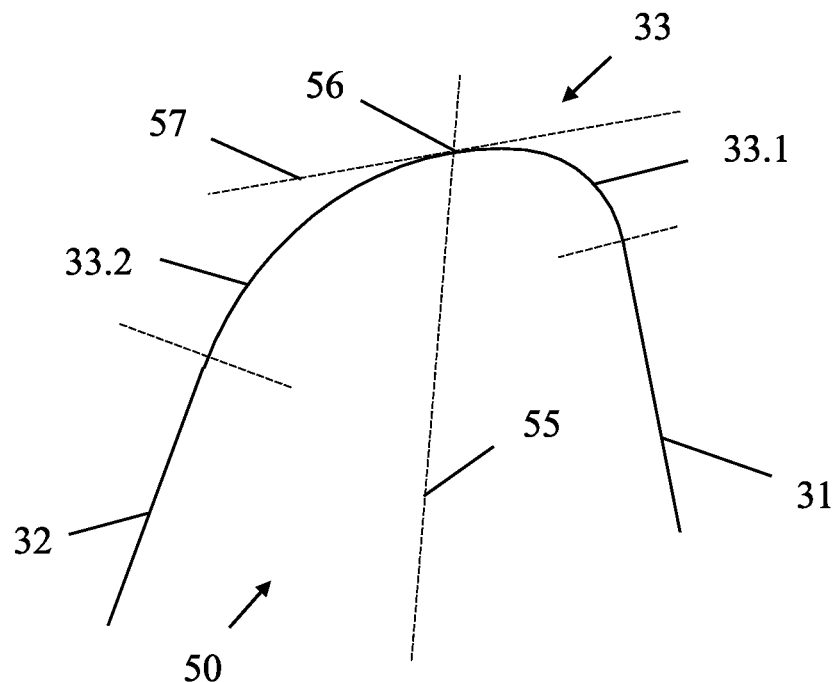
FIG. 4 shows a view of a detail of FIG. 3.

FIG. 4 shows the groove 50 formed between the contact flank 31 and the free flank 32 once more in a detailed view (also in a tangential section). Shown further is an angle bisecting line 55 that bisects the intermediate segment 33 in the base 56 of the groove, a line that lies in the middle between contact flank 31 and free flank 32. A tangent 57 that is indicated there lies diagonally due to the asymmetric shaping, thus not at a right angle to the angle bisecting line.

Figure 5:
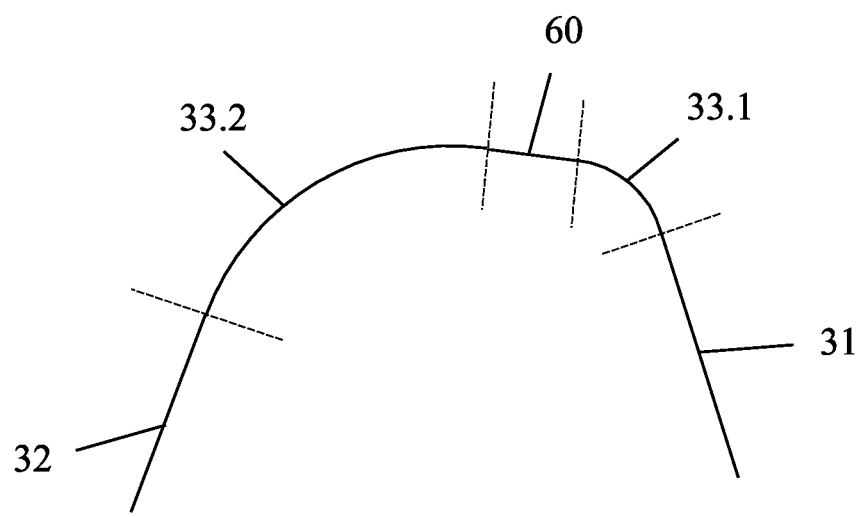
FIG. 5 shows an alternative embodiment of the profiling of FIG. 4.

FIG. 5 shows a slightly modified embodiment, in which the first and the second transition segments 33.1, 33.2 do not directly transition into one another. Instead of this, a central segment 60 is formed therebetween, which extends linearly and in each case tangentially into the two transition segments 33.1, 33.2.

What is claimed is:

1. A rotating blade for a turbomachine, comprising
   a blade element and a shroud,
   wherein the shroud is profiled at a peripheral side when observed in a tangential section,
   has a linear contact flank that is oriented axially, at least proportionally, and
   has a linear free flank that is also oriented axially, at least proportionally, and is
   opposite the contact flank,
   wherein, when observed in the tangential section, an intermediate segment between the contact flank and the free flank
   in a first transition segment to the contact flank has a first curvature, the contact flank being tangential to the first curvature where the contact flank meets the first transition segment, and
   in a second transition segment to the free flank has a second curvature,
   wherein the first curvature is greater than the second curvature, and
   wherein each curvature between the contact flank and the free flank is concave.

2. The rotating blade according to claim 1, in which the intermediate segment between the first and the second transition segments has a central segment, which runs linearly when observed in the tangential section.

3. The rotating blade according to claim 1, wherein, in the intermediate segment, the first and the second transition segments transition directly into one another.

4. The rotating blade according to claim 1, wherein the intermediate segment, when observed in the tangential section, has a constant first radius of curvature $R_1$ over the first transition segment.

5. The rotating blade according to claim 4, wherein the intermediate segment, when observed in the tangential section, apart from a linear extension that is in sections, is included exclusively with the first and the second radii of curvature $R_1$, $R_2$.

6. The rotating blade according to claim 1, wherein the intermediate segment, when observed in the tangential section, has a constant second radius of curvature $R_2$ over the second transition segment.

7. The rotating blade according to claim 6, wherein the intermediate segment, when observed in the tangential section, apart from a linear extension that is in sections, is included exclusively with the first and the second radii of curvature $R_1$, $R_2$.

8. The rotating blade according to claim 1, wherein, when observed in a tangential section, from the contact flank to the free flank, every transition from a curved to a linear segment is tangential.

9. The rotating blade according to claim 1, wherein the first transition segment, when observed in the tangential section, transitions tangentially into the contact flank.

10. The rotating blade according to claim 1, wherein the second transition segment, when observed in the tangential section, transitions tangentially into the free flank.

11. The rotating blade according to claim 1, wherein, when observed in the tangential section, an angle bisecting line that lies in the middle between the contact flank and the free flank and bisects the intermediate segment in a groove base, lies diagonally to a tangent placed in the groove base of the intermediate segment.

12. The rotating blade according to claim 1, wherein the intermediate segment, when observed in the tangential section, apart from a linear extension optionally in sections, is curved exclusively concavely.

13. A rotating blade ring having a rotating blade according to claim 1.

14. A turbine module having a rotating blade ring according to claim 13.

15. A turbine module having a rotating blade according to claim 1.

16. A jet engine, having a turbine module according to claim 15.

* * * * *